(12) United States Patent
Johannsen et al.

(10) Patent No.: US 7,877,977 B2
(45) Date of Patent: Feb. 1, 2011

(54) MASTER LINK FOR A TRACK CHAIN

(75) Inventors: Eric James Johannsen, Washington, IL (US); Kevin Lee Steiner, Tremont, IL (US); Donovan Stuart Clarke, Hanna City, IL (US); Jeffrey Paul Nash, Peoria, IL (US); Jennifer Ann Brooks, Germantown Hills, IL (US); Roger L. Recker, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 229 days.

(21) Appl. No.: 12/314,591

(22) Filed: Dec. 12, 2008

(65) Prior Publication Data

US 2010/0146925 A1    Jun. 17, 2010

(51) Int. Cl.
B62D 55/205    (2006.01)
B62D 55/092    (2006.01)

(52) U.S. Cl. .............................. 59/78; 305/186; 59/35.1

(58) Field of Classification Search ................. 305/102, 305/185, 186; 59/78, 93, 4, 5, 35.1
See application file for complete search history.

(56) References Cited

U.S. PATENT DOCUMENTS

| | | | |
|---|---|---|---|
| 1,258,605 A | 3/1918 | Norelius et al. | |
| 2,743,140 A | 4/1956 | Bauer, Jr. | |
| 3,171,695 A | 3/1965 | Schick | |
| 3,237,999 A | 3/1966 | Pentecost | |
| 3,567,294 A | 3/1971 | Simpson et al. | |
| 3,595,572 A | 7/1971 | Granda | |
| 3,680,929 A | 8/1972 | Hnilicka et al. | |
| 3,822,923 A * | 7/1974 | Stedman | 305/186 |
| 4,105,260 A * | 8/1978 | Blunier et al. | 305/186 |
| 4,332,425 A * | 6/1982 | Baylor | 305/186 |
| 4,365,848 A * | 12/1982 | Grilli et al. | 305/186 |
| 4,457,565 A * | 7/1984 | Bissi et al. | 305/186 |
| 4,553,791 A | 11/1985 | Blair | |
| 4,579,394 A * | 4/1986 | Bedis et al. | 305/186 |
| 4,636,014 A * | 1/1987 | Dennison et al. | 305/186 |
| 5,183,318 A | 2/1993 | Taft et al. | |
| 5,749,635 A | 5/1998 | Umbarger | |
| 5,887,958 A | 3/1999 | Bissi et al. | |
| 6,322,173 B1 | 11/2001 | Maguire et al. | |
| 6,371,577 B1 | 4/2002 | Hasselbusch et al. | |
| 6,382,742 B1 * | 5/2002 | Hasselbusch et al. | 305/102 |

(Continued)

FOREIGN PATENT DOCUMENTS

LR    1020080098523    11/2008

*Primary Examiner*—David B Jones

(57) ABSTRACT

A master link for a chain assembly is provided. The master link includes a body member with a first side, a second side positioned opposite the first side, a shoe surface configured to receive a track shoe, and a rail surface positioned opposite the shoe surface. The master link also includes first and second apertures extending through the body member from the first side to the second side and third and fourth apertures located between the first and second apertures. The master link also includes a strut member dividing the third and fourth apertures. The master link also includes a first gap located in the body member and extending from the first aperture to the third aperture and a second gap located in the body member and extending from the fourth aperture to the second aperture. The master link further includes a third gap located in the strut member and extending from the third aperture to the fourth aperture.

20 Claims, 3 Drawing Sheets

U.S. PATENT DOCUMENTS

| | | |
|---|---|---|
| 6,386,651 B1 | 5/2002 | Gerardin et al. |
| 6,412,267 B2 * | 7/2002 | Duse .......................... 59/35.1 |
| 6,564,539 B2 | 5/2003 | Bedford et al. |
| 6,783,196 B2 | 8/2004 | Maguire et al. |
| 6,866,351 B2 * | 3/2005 | Yamamoto .................. 305/185 |
| 7,325,889 B2 | 2/2008 | Yamamoto et al. |
| 7,614,709 B2 * | 11/2009 | Oertley ....................... 305/186 |
| 2003/0122425 A1 | 7/2003 | Banerjee |
| 2004/0032166 A1 | 2/2004 | Maguire et al. |
| 2006/0181151 A1 | 8/2006 | Wodrich et al. |
| 2008/0174175 A1 | 7/2008 | Livesay et al. |

* cited by examiner

MASTER LINK FOR A TRACK CHAIN

TECHNICAL FIELD

The present disclosure is directed to a master link for a track chain and, more particularly, to a strutted master link for a track chain.

BACKGROUND

Track type machines typically utilize chains on either side of the machine that are connected to surface engaging elements, known as track shoes, to move the machine. A sprocket, driven by an engine of the machine, engages and translates the chain about spaced apart pulley mechanisms. As the chain translates, the connected track shoes engage a surface under the machine, e.g., the ground, transmit torque from the sprocket to the surface, and thereby propel the machine relative to the surface. Depending on the weight of the machine, the size of the chain, the environment in which the machine operates, and other factors, the chains and/or track shoes may wear or be damaged and may require periodic inspection, servicing, repair, and/or replacement. Typically, a master link is provided in the chain to allow disassembly of the chain (i.e., separation of two ends of the chain).

An exemplary master link is disclosed in U.S. Pat. No. 6,783,196 ("the '196 patent") issued to Maguire et al. The '196 patent discloses an embodiment of a master link including a unitary body with first and second apertures spaced apart and axially extending through the body. Each of the first and second apertures are configured to receive respective pins that connect the master link to adjacent links of a track chain. The master link also includes first and second gaps longitudinally extending through the body from respective ones of the first and second apertures to a third aperture. The third aperture axially extends through the body in a direction substantially similar to the first and second apertures. Fourth and fifth apertures, configured to receive fasteners, extend through the body of the master link and across the respective first and second gaps. As the fasteners are secured, i.e., tightened, the width of the respective first and second gaps decrease against the natural rigidity of the master link. Decreasing the first and second gaps reduces the respective diameters of the first and second apertures and may provide a clamping force on the pins to secure the master link to the adjacent links of the track chain.

Because the first and second gaps of the '196 patent extend from the first and second apertures to the third aperture, undesired stresses may form within the fasteners. For example, tightening the fasteners to decrease the first and second gaps, places the fasteners in axial tension as they overcome the natural rigidity of the body of the master link. Because the first and second gaps extend to the third aperture, and because the fasteners may not completely close the first and second gaps, substantially all of the transverse stresses transferred from the pins within the first and second apertures to the body of the master link may be undesirably transferred directly to the fasteners. These undesired stresses may lead to mechanical failure.

The disclosed system is directed to overcoming one or more of the shortcomings set forth above and/or other shortcomings in the art.

SUMMARY

In one aspect, the present disclosure is directed toward a master link for a chain assembly. The master link includes a body member with a first side, a second side positioned opposite the first side, a shoe surface configured to receive a track shoe, and a rail surface positioned opposite the shoe surface. The master link also includes first and second apertures extending through the body member from the first side to the second side and third and fourth apertures extending through the body member from the first side to the second side and located between the first and second apertures. The master link also includes a strut member dividing the third and fourth apertures. The master link also includes a first gap located in the body member and extending from the first aperture to the third aperture and a second gap located in the body member and extending from the fourth aperture to the second aperture. The master link further includes a third gap located in the strut member and extending from the third aperture to the fourth aperture.

In another aspect, the present disclosure is directed toward a track chain assembly. The track chain assembly includes a plurality of link subassemblies, each being connected to an adjacent link subassembly. The assembly also includes a master link subassembly having at least one master link. The at least one master link includes a body member having a first side, a second side positioned opposite the first side, a shoe surface configured to receive a track shoe, and a rail surface positioned opposite the shoe surface. The at least one master link also includes first and second apertures extending through the body member from the first side to the second side. The at least one master link also includes third and fourth apertures extending through the body member from the first side to the second side and located between the first and second apertures. The at least one master link also includes a strut member dividing the third and fourth apertures. The master link also includes a first gap located in the body member and extending from the first aperture to the third aperture and a second gap located in the body member and extending from the fourth aperture to the second aperture. The master link further includes a third gap located in the strut member and extending from the third aperture to the fourth aperture.

DETAILED DESCRIPTION

Figure 1:
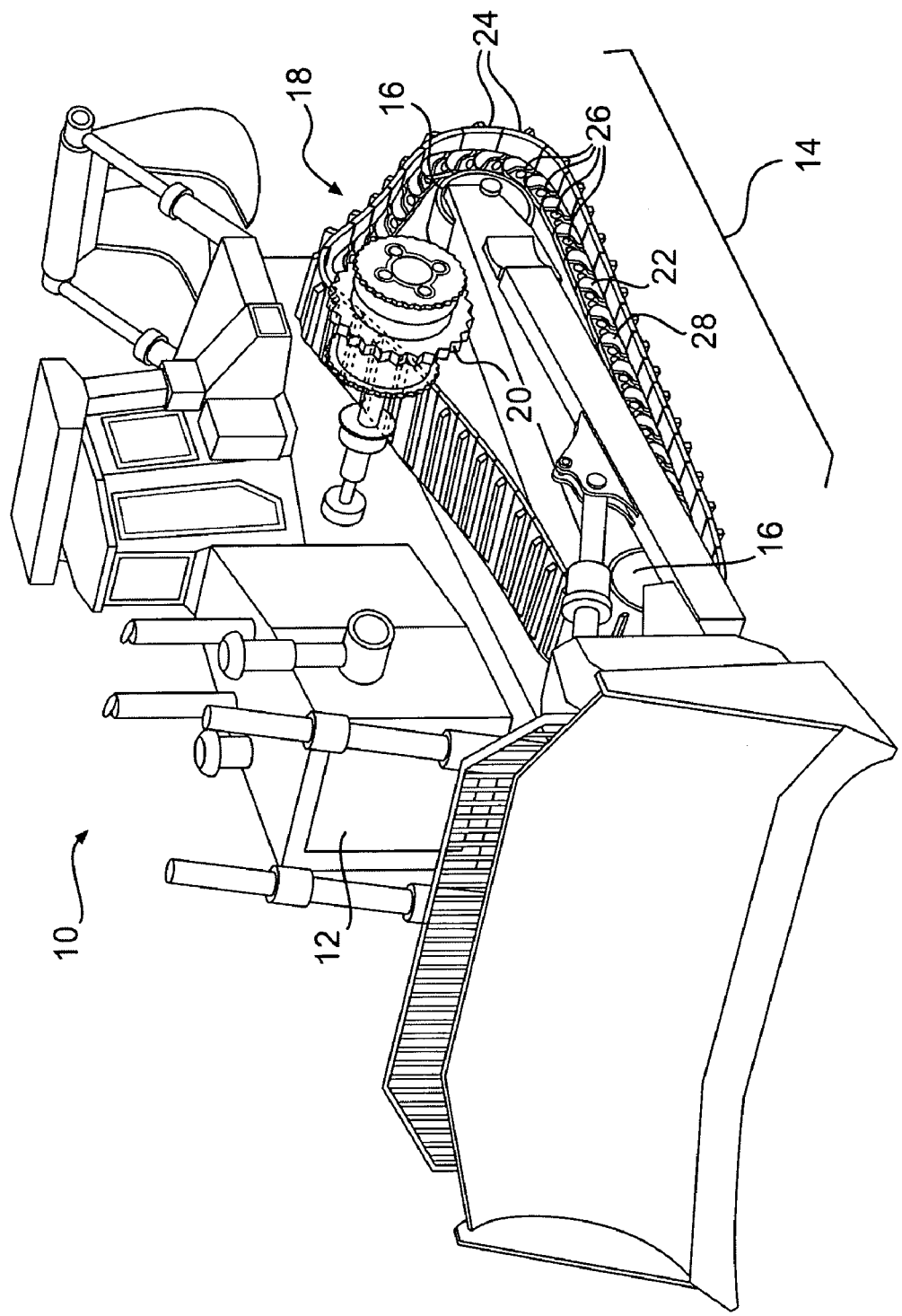
FIG. 1 is a diagrammatic illustration of an exemplary disclosed machine.

FIG. 1 illustrates an exemplary machine 10 having multiple systems and components that cooperate to accomplish a task. Machine 10 may embody a mobile machine that performs some type of operation associated with an industry such as mining, construction, farming, transportation, or any other industry known in the art. For example, machine 10 may be an earth moving machine such as an excavator, a dozer, a loader, a backhoe, a motor grader, or any other earth moving machine. Machine 10 may include a power source 12 and an undercarriage assembly 14, which may be driven by power source 12 and supported by one or more spaced-apart pulley mechanisms 16.

Power source 12 may drive undercarriage assembly 14 of machine 10 at a range of output speeds and torques. Power source 12 may be an engine such as, for example, a diesel engine, a gasoline engine, a gaseous fuel-powered engine, or any other suitable engine. Power source 12 may also be a non-combustion source of power such as, for example, a fuel cell, a power storage device, or any other source of power known in the art.

Undercarriage assembly 14 may include two separate continuous tracks 18, one on either side of machine 10 (only one of which is shown in FIG. 1). Each track 18 may be driven by power source 12 via one or more sprockets 20. In addition, each track 18 may include a chain 22 and a plurality of track shoes 24, each configured to selectively engage a surface, e.g., the ground. Each chain 22 may include a plurality of link subassemblies 26 and a master link subassembly 28.

Figure 2:
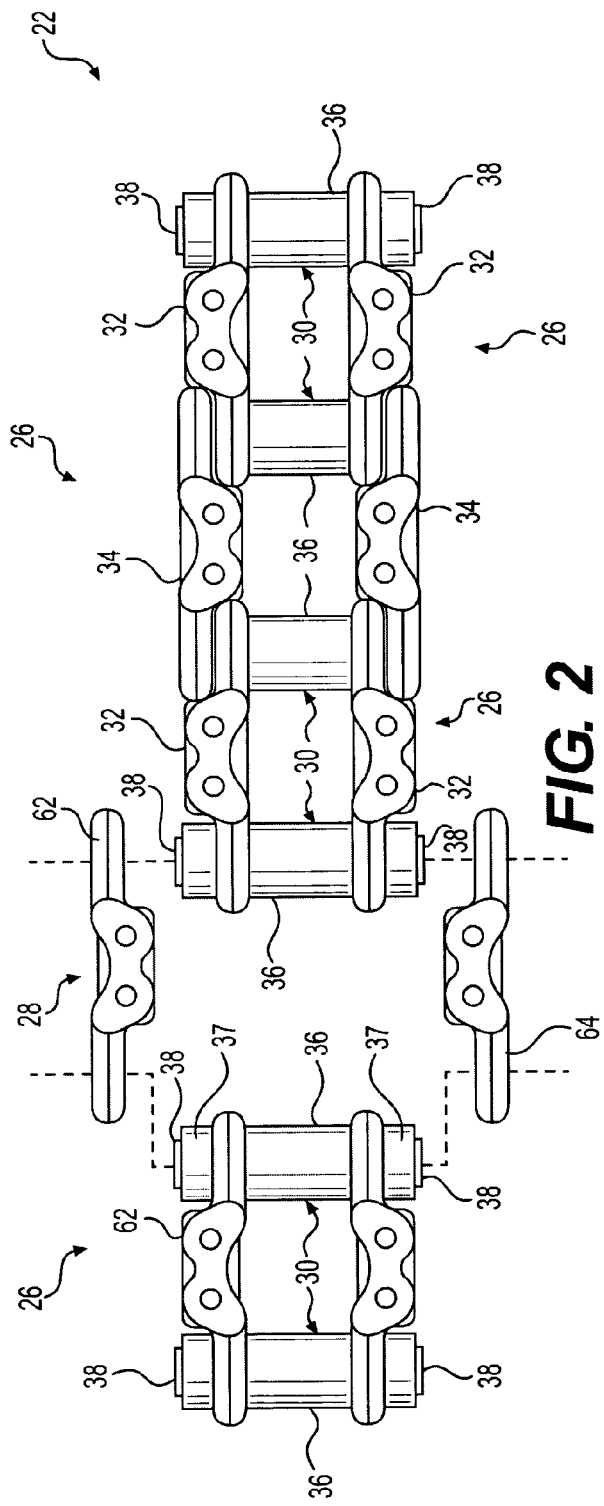
FIG. 2 is a diagrammatic top-view illustration of an exemplary disclosed track chain of the machine of FIG. 1.
Figure 3:
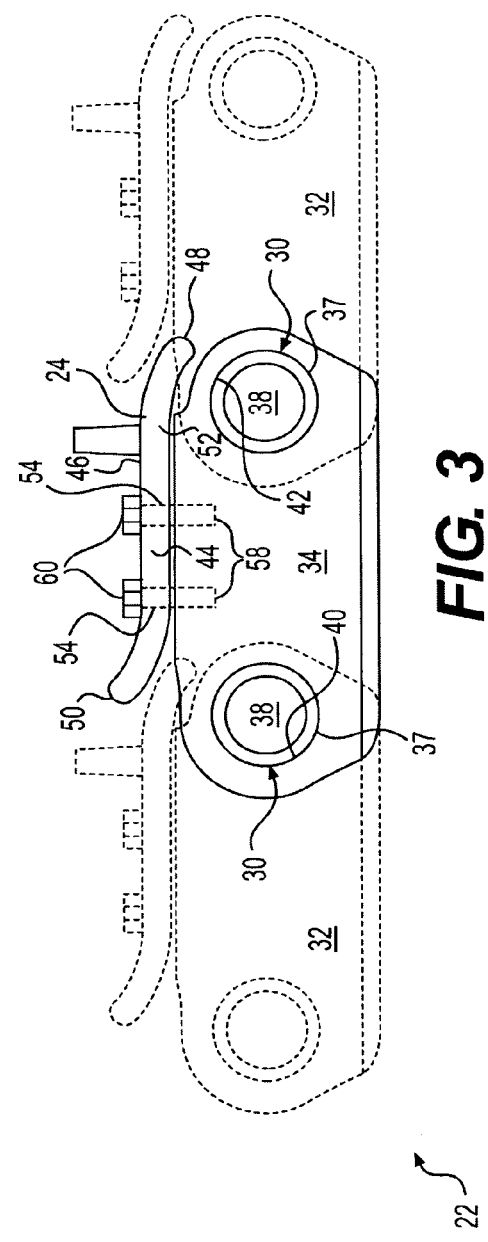
FIG. 3 is a diagrammatic side-view illustration of exemplary disclosed track chain of the machine of FIG. 1.

FIGS. 2 and 3 respectively illustrate top-view and side-view perspectives of an exemplary chain 22 and, specifically, a plurality of exemplary link subassemblies 26 and a master link assembly 28. Each one of link subassemblies 26 may include a respective pair of inner links 32 or a respective pair of outer links 34. Each of inner and outer links 32 and 34 may include fastener holes 58, e.g., a threaded hole, configured to receive a fastener 60, e.g., a bolt, or cap screw, to attach a track shoe 24 to a given one of link subassemblies 26. Master link assembly 28 may include a first master link 62 and a second master link 64. First and second master links 62, 64 will be further described below with reference to FIGS. 4 and 5. Adjacent ones of link subassemblies 26 may be interconnected by way of rod members 30. Each rod member 30 may include a substantially cylindrical bushing 36 disposed about a substantially cylindrical pin 38. Each rod member 30 may also include a pair of bearings (not shown) that are freely rotatable relative to pin 38, and a pair of collars 37, that are fixed relative to pin 38. Each one of the pair of collars may be disposed at a respective end of pin 38, bushing 36 may be disposed substantially in the middle of pin 38, and each one of the pair of bearings may be disposed between a respective one of the collars 37 and bushing 36.

Inner links 32 may include an aperture 40 configured to receive a first rod member 30 and an aperture 42 configured to receive a second rod member 30. Outer links 34 may be disposed in a substantially similar orientation as inner links 32, and may be configured to similarly receive opposing ends of the first and second rod members 30. As is known in the art, first and second rod members 30 may interface with apertures 40, 42 of inner and outer links 32, 34 such that consecutively connected link subassemblies 26 may be pivotally interconnected to one another to form chain 22. For example, inner links 32 may be configured to engage the bearings via apertures 40, 42 and pivot with respect to pin 38 and outer links 34 may be configured to engage collars 37 via apertures 40, 42 and be fixed with respect to pin 38. As such, adjacent link subassemblies 26, i.e., a pair of inner links 32 or a pair of outer links 34, may be configured to pivot with respect to one another to form an articulating chain 22. Similarly, master link subassembly 28 may be interconnected between two link subassemblies 26 by way of rod members 30. The interconnection between master link assembly 28 and rod members 30 will be described in more detail below with reference to FIGS. 4 and 5.

A track shoe 24 may be connected to each respective pair of inner and outer links 32, 34. Each track shoe 24 may include a base portion 44, a ground-engaging surface 46, a leading edge 48, and a trailing edge 50. Each track shoe 24 may also include opposing side edges 52 (only one of which shown in FIG. 3) disposed between leading edge 48 and trailing edge 50. Additionally, each track shoe 24 may also include two pairs of threaded shoe holes 54, each pair disposed along a respective one of side edges 52 and configured to align with a pair of fastener holes 58 associated with a respective one of inner or outer links 32, 34. Specifically, each one of shoe holes 54 may correspond to an associated fastener receiving hole 58 situated within each of inner and outer links 32, 34. As such, each track shoe 24 may respectively connect to a pair of opposing inner links 32 and a pair of opposing outer links 34, such that one track shoe 24 may be associated with two opposing inner links 32 or two opposing outer links 34. Threaded fasteners 60, such as, for example, bolts or capscrews, may be respectively disposed in each one of shoe holes 54 and fastener receiving holes 58 to fasten a track shoe 24 to a respective pair of inner and outer links 32, 34. It is contemplated that the spacing of fastener receiving holes 58 for each pair of inner and outer links 32, 34 may be substantially similar such that each track shoe 24 may be configured to be connectable to a pair of inner links 32 or a pair of outer links 34.

Figure 4:
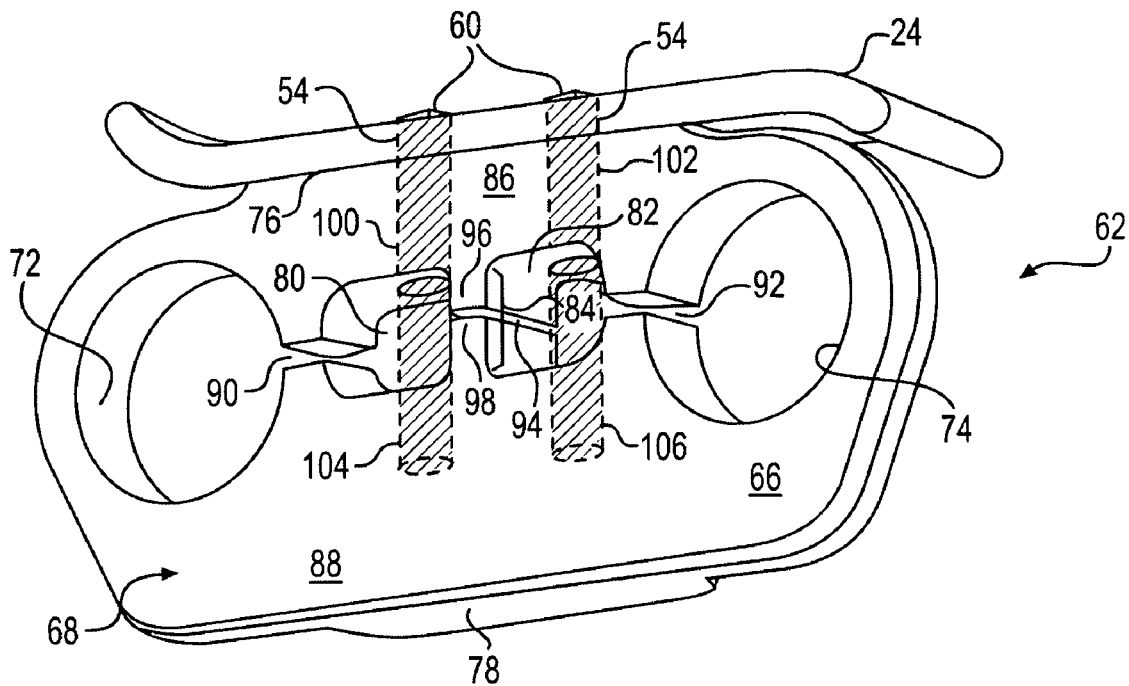
FIG. 4 is a diagrammatic illustration of a first side of an exemplary master link of the track chain of FIG. 2.
Figure 5:
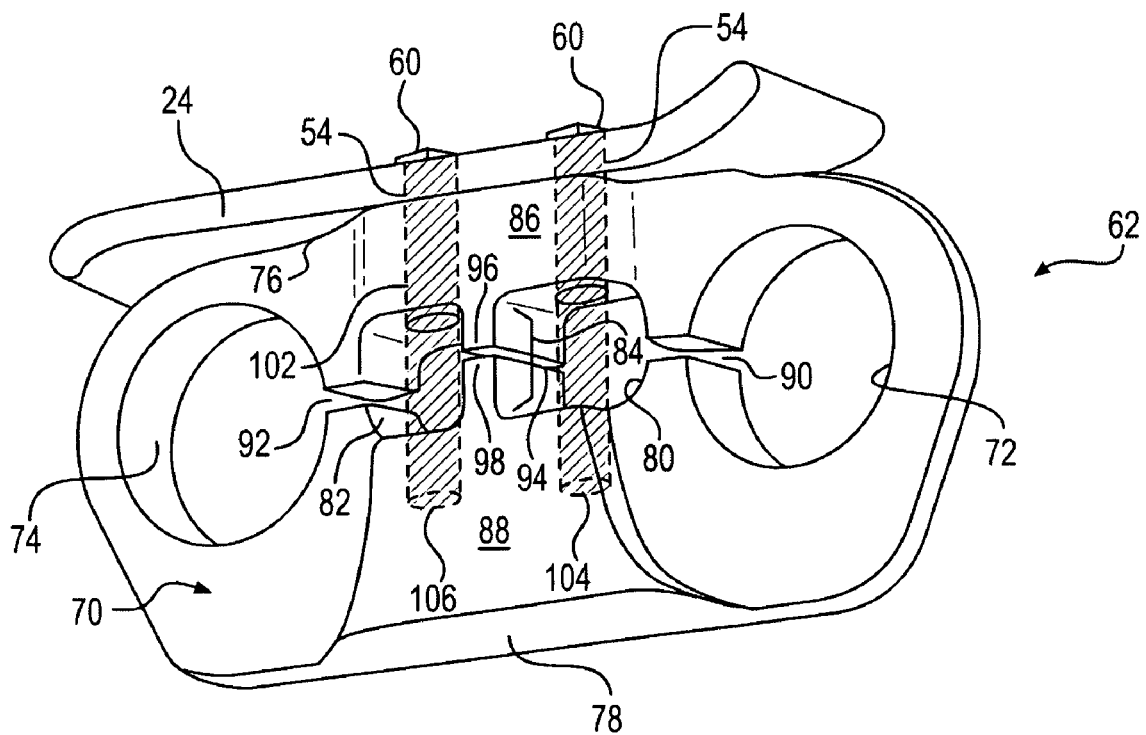
FIG. 5 is a diagrammatic illustration of a second side of the exemplary master link of FIG. 4.

FIGS. 4 and 5 respectively illustrate first and second sides of first master link 62. First and second master links 62, 64 may be substantially similar and the following description of first master link 62 is equally applicable to second master link 64. First master link 62 may include a body member 66 with a first side 68 (FIG. 4) and a second side 70 (FIG. 5) spaced opposite first side 68. First side 68 may be substantially planar, while second side 70 may be contoured to accommodate the connection between first master link 62 and an adjacent one of inner links 32. Specifically, second side 70 may include a relatively thicker middle portion and relatively thinner left and right portions of body member 66 (as shown in and with respect to FIG. 5). It is contemplated that first and second master links 62, 64 may be arranged such that second side 70 of first master link 62 faces second side 70 of second master link 64. As such, master link 28 assembly may be configured to interconnect between two adjacent pairs of inner links 32.

Body member 66 may include first and second apertures 72, 74 for receiving rod members 30, a shoe surface 76 adjacent track shoe 24, and a rail surface 78 opposite shoe surface 76. Body member 66 may also include third and fourth apertures 80, 82 extending from first side 68 to second side 70, interposed between first and second apertures 72, 74, and separated by a selectively unified strut member 84.

Body member 66 may further include an upper body portion 86 and a lower body portion 88 separated by a first gap 90, a second gap 92, and a third gap 94. Specifically, first gap 90 may extend from first aperture 72 to third aperture 80 and second gap 92 may extend from second aperture 74 to fourth aperture 82. Third gap 94 may extend from third aperture 80 to fourth aperture 82. The natural rigidity of body member 66 may keep upper and lower body portions 86, 88 separated from each other and may maintain first, second, and third gaps 90, 92, 94 at their maximum widths. The natural rigidity of body member 66 may be overcome by urging upper and lower body portions 86, 88 toward one another via fasteners 60 to reduce the respective widths of first, second, and third gaps 90, 92, 94 as will be explained more fully below. First and second gaps 90, 92 may be configured such that the diameters of first and second apertures 72, 74 may change as the widths of first and second gaps 90, 92 change. That is, as the widths of first and second gaps 90, 92 decrease, the diameters of first and second apertures 72, 74 may respectively decrease and as the widths of first and second gaps 90, 92 increase, the diameters of first and second apertures 72, 74 may respectively increase. As will be further explained below, reducing the diameters of first and second apertures 72, 74 may affect the inner walls thereof to selectively clamp respective rod members 30.

To facilitate movement between upper and lower body portions 86, 88, body member 66 may be made from any material known in the art having enough rigidity to maintain upper and lower body portions 86, 88 separated without the application of a biasing force, while at the same time, being malleable enough to permit upper and lower body portions 86, 88 to be urged toward each other with the addition of a biasing force sufficient to overcome the natural rigidity of body member 66. In addition, the material from which body member 66 is made may be durable enough to withstand the biasing forces configured to overcome the natural rigidity thereof, i.e., configured to decrease first, second, and third gaps 90, 92, 94, without fracturing or otherwise failing. For example, body member 66 may be made from a carbon steel such as a 15B34 carbon steel. It is contemplated that such material may be covered with a protective coating that may shield first master link 62 from the environment in which machine 10 may be operating. It is further contemplated that fasteners 60 may be made from the same material as body member 66.

Selectively unified strut member 84, may include upper and lower strut members 96, 98 formed between third and fourth apertures 80, 82 and separated by third gap 94. Upper and lower body portions 86, 88 may be selectively disengaged when upper and lower strut portions 96, 98 are separated, i.e., when selectively unified strut member 84 is not unified. When gap 94 completely closes, i.e., when upper and lower strut portions 96, 98 engage one another, upper and lower strut portions 96, 98 may form an abutted joint. As such, contact friction between upper and lower strut portions 96, 98 may be generated and may minimize or prevent lateral movement between upper and lower strut portions 96, 98. By preventing or minimizing lateral movement between upper and lower strut portions 96, 98, upper and lower strut portions 96, 98 may selectively act, when gap 94 as a closed, as a single, unified strut. It is contemplated that by selectively forming a single, unified strut, by selectively closing gap 94, the stability of body member 66 may be increased as compared to a body member that maintains a gap between its upper and lower body portions. It is also contemplated that a unitary strut body, i.e., a solid strut that does not include two strut portions selectively separable by a gap, may substantially resist upper and lower body portions 86, 88 moving relative to one other and may correspondingly reduce the clamping forces applied to rod members 30 via first and second apertures 70, 72. As such, selectively closing third gap 94 to selectively engage upper and lower strut portions 96, 98, may reduce stress, e.g., tensile and cyclic stresses, on threaded fasteners 60.

To ensure that both upper strut portion 96 and lower strut portion 98 may engage each other, the maximum width of third gap 94 may be smaller than the maximum widths of first and second gaps 90, 92. Due to inconsistencies common in the processes associated with forming first, second, and third gaps 90, 92, 94, forming the third gap 94 to a target maximum width substantially the same as the maximum widths of first and second gaps 90, 92 may result in the maximum width of third gap 94 actually being larger than the maximum widths of first and second gaps 90, 92. In such an arrangement, the movement of upper and lower strut members 96, 98 may be limited by the widths of first and second gaps 90, 92, and upper and lower strut members 96, 98 may be prevented from engaging each other. If upper and lower strut members 96, 98 are prevented from engaging each other, the stability provided by selectively unified strut member 84 may be reduced.

Similar to pairs of inner and outer links 32, 34, a track shoe 24 may also be connected to a respective pair of first and second master links 62, 64. Body member 66 may include a first fastener receiving hole 100 located within upper body portion 86 and extending from shoe surface 76 to third aperture 80. Body member 66 may also include a second fastener receiving hole 102 located in upper body portion 86 and extending from shoe surface 76 to fourth aperture 82. The walls of both first fastener receiving hole 100 and second fastener receiving hole 102 may be machined to substantially match the threading of fasteners 60 and shoe holes 54. When connecting track shoe 24 to first master link 62, shoe holes 54 may be aligned with first and second fastener receiving holes 100, 102 so that each fastener 60 may be received by a corresponding shoe hole 54 and adjacent first or second fastener receiving hole 100, 102.

In addition to first and second fastener receiving holes 100, 102, body member 66 may include a third fastener receiving hole 104 and a fourth fastener receiving hole 106 located within lower body portion 88. Third fastener receiving hole 104 may be located opposite first fastener receiving hole 100 and may extend from third aperture 80 toward rail surface 78, terminating at a location short of rail surface 78. Fourth fastener receiving hole 106 may be positioned opposite second fastener receiving hole 102 and may extend from fourth aperture 82 toward rail surface 78, terminating at location short of rail surface 78. The walls of both third fastener receiving hole 104 and fourth fastener receiving hole 106 may be machined to substantially match the threading of first and second fastener receiving holes 100, 102. Furthermore, third and fourth fastener receiving holes 104, 106 may have a length configured to permit fasteners 60 to exert a biasing force between respective upper and lower body portions 86, 88 and overcome the natural rigidity of body member 66 that maintains first, second, and third gaps 90, 92, 94 and separates upper and lower body portions 86, 88. Although, first, second, third, and fourth fastener receiving holes 100, 102, 104, 106 are illustrated as being axially oriented in a direction substantially perpendicular to shoe and rail surfaces 76, 78, first, second, third, and fourth fastener receiving holes 100, 102, 104, 106 may be oriented in any direction configured to allow fasteners 60 to exert sufficient force on inner master link 62 to overcome the rigidity of body member 66 and bias upper and lower body portions 86, 88 closer together.

INDUSTRIAL APPLICABILITY

The master link assembly 28 and, in particular the first and second master links 62, 64 of the present disclosure, may be applicable to any tracked machine 10. First and second master links 62, 64 increase the durability of the each track 18 and the undercarriage assembly 14 by selectively increasing the stability of body member 66 by preventing or minimizing lateral movement between upper and lower strut portions 96, 98. Further, the present disclosure may reduce maintenance costs by reducing the likelihood that fasteners 60, securing first and second master links 62, 64, i.e., master link assembly 28, to the chain 22, may fail.

When connecting master link subassembly 28 to chain 22, fasteners 60 and track shoe 24 may initially be separated from first and second master links 62, 64. In such a state, first, second, and third gaps 90, 92, 94 may be at their maximum widths. Additionally, first and second apertures 72, 74 may be at their maximum diameters and configured to receive rod members 30 therein. After first and second apertures 72, 74 receive rod members 30, track shoe 24 may be secured to inner and outer master links 62, 64 by inserting fasteners 60 respectively into shoe holes 54 and first, second, third, and fourth fastener receiving holes 100, 102, 104, and 106. As each fastener 60 is tightened, it may apply a biasing force to overcome the rigidity of body member 66 and may urge upper and lower body portions 86, 88 toward each other. As upper and lower body portions 86, 88 move toward each other, the widths of first, second, and third gaps 90, 92, 94 may be reduced. In addition, the diameters of first and second apertures 72, 74 may be reduced and rod members 30 may be clamped therein.

Because the maximum width of third gap 94 may be less than the maximum widths of first and second gaps 90 and 92, third gap 94 may limit the movement of upper and lower body portions 86 and 88 when upper and lower body portions 86, 88 are being forced together. The maximum width of third gap 94 may also limit the amount by which the diameters of first and second apertures 72, 74 may be reduced. For example, in an exemplary embodiment third gap 94 may have a maximum width of approximately 0.75 millimeters. Therefore, the maximum distance upper and lower body portions 86 and 88 may move toward each other may also be approximately 0.75 millimeters. In addition, the widths of first and second gaps 90 and 92 and the diameters of first and second apertures 72, 74 may also be reduced by approximately 0.75 millimeters. Since the amount of clamping force generated by the inner walls of first and second apertures 72, 74 may be related to the sizes of the diameters of first and second apertures 72, 74, the width of third gap 94 may affect the amount of clamping force acting on rod members 30. Therefore, the difference between the maximum width of third gap 94 and the maximum widths of first and second gaps 90, 92 may be sized so that first and second apertures 72, 74 may generate sufficient clamping force to retain rod members 30 within first and second apertures 72, 74.

Providing third and fourth apertures 80, 82 within body member 66 may reduce the amount of material necessary for forming each of first and second master links 62, 64 and thus, may reduce the manufacturing costs thereof. Providing a selectively unified strut member 84 in the body 66 member of first and second master links 62, 64 may reduce the shear stresses transferred from body member 66 to fasteners 60, thus reducing the likelihood that the fasteners 60 will fail.

It will be apparent to those skilled in the art that various modifications and variations can be made in the disclosed system without departing from the scope of the disclosure. Other embodiments will be apparent to those skilled in the art from consideration of the specification disclosed herein. It is intended that the specification and examples be considered as exemplary only, with a true scope being indicated by the following claims and their equivalents.

What is claimed is:

1. A master link for a chain assembly, comprising:
    a body member having a first side, a second side positioned opposite the first side, a shoe surface configured to receive a track shoe, and a rail surface positioned opposite the shoe surface;
    first and second apertures extending through the body member from the first side to the second side;
    third and fourth apertures extending through the body member from the first side to the second side and located between the first and second apertures;
    a strut member dividing the third and fourth apertures;
    a first gap located in the body member and extending from the first aperture to the third aperture;
    a second gap located in the body member and extending from the fourth aperture to the second aperture; and
    a third gap located in the strut member and extending from the third aperture to the fourth aperture.

2. The master link of claim 1, further including a first fastener receiving hole extending from the shoe receiving surface to the third aperture and a second fastener receiving hole extending from the third aperture to a location between the third aperture and the rail surface.

3. The master link of claim 2, further including a second fastener receiving hole extending from the shoe receiving surface to the fourth aperture and a fourth fastener receiving hole extending from the fourth aperture to a location between the fourth aperture and the rail surface.

4. The master link of claim 1, wherein the first, second, and third gaps are configured so that the diameters of the first and second apertures change as the widths of the first, second, and third gaps change.

5. The master link of claim 1, wherein the width of the third gap is smaller than the first and second gaps.

6. The master link of claim 1, wherein the strut member includes a first strut portion and a second strut portion selectively separated from the first gap portion via the third gap and the third gap is sized such that it can be selectively closed while the first and second gaps can remain opened to selectively engage the first and second strut portions.

7. The master link of claim 1, wherein the third gap is sized and located so that changes in the diameters of the first and second apertures are limited by the change in the width of the third gap.

8. A track chain assembly, comprising:
    a plurality of link subassemblies each being connected to an adjacent link subassembly;
    a master link subassembly having at least one master link, the at least one master link including:
        a body member having a first side, a second side positioned opposite the first side, a shoe surface configured to receive a track shoe, and a rail surface positioned opposite the shoe surface;
        first and second apertures extending through the body member from the first side to the second side;
        third and fourth apertures extending through the body member from the first side to the second side and located between the first and second apertures;
        a strut member dividing the third and fourth apertures;
        a first gap located in the body member and extending from the first aperture to the third aperture;
        a second gap located in the body member and extending from the fourth aperture to the second aperture; and
        a third gap located in the strut member and extending from the third aperture to the fourth aperture.

9. The track chain assembly of claim 8, wherein the at least one master link further includes a first fastener receiving hole extending from the shoe receiving surface to the third aperture, a second fastener receiving hole extending from the shoe receiving surface to the fourth aperture, a third fastener receiving hole extending from the third aperture to a location between the third aperture and the rail surface, and a fourth fastener receiving hole extending from the fourth aperture to a location between the fourth aperture and the rail surface.

10. The track chain assembly of claim 8, wherein the first, second, and third gaps are situated so that the diameters of the first and second apertures change as the widths of the first, second, and third gaps change.

11. The track chain assembly of claim 8, wherein the width of the third gap is smaller than the first and second gaps.

12. The track chain assembly of claim 8, wherein the strut member includes a first strut portion and a second strut portion selectively separated from the first gap portion via the third gap and the third gap is sized such that it can be selectively closed while the first and second gaps can remain opened to selectively engage the first and second strut portions.

13. The track chain assembly of claim 8, wherein the third gap is sized and located so that changes in the diameters of the first and second apertures are limited by the change in the width of the third gap.

14. The track chain assembly of claim 8, wherein the body member of the at least one master link is a single element.

15. A track chain assembly, comprising:
a plurality of link subassemblies each being connected to an adjacent link subassembly;
first and second master links connected to at least one of the plurality of link subassemblies, each of the first and second master links including:
a body member having a unitary body with a first side, a second side positioned opposite the first side, a shoe surface configured to receive a track shoe, and a rail surface positioned opposite the shoe surface;
first and second apertures extending through the body member from the first side to the second side;
third and fourth apertures extending through the body member from the first side to the second side and disposed between the first and second apertures;
a strut member dividing third and fourth apertures;
a first gap located in the body member and extending from the first aperture to the third aperture;
a second gap located in the body member and extending from the fourth aperture to the second aperture; and
a third gap located in the strut member and extending from the third aperture to the fourth aperture.

16. The track chain assembly of claim 15, wherein the at least one master link further includes a first fastener receiving hole extending from the shoe receiving surface to the third aperture, a second fastener receiving hole extending from the shoe receiving surface to the fourth aperture, a third fastener receiving hole extending from the third aperture to a location between the third aperture and the rail surface, and a fourth fastener receiving hole extending from the fourth aperture to a location between the fourth aperture and the rail surface.

17. The track chain assembly of claim 15, wherein the first, second, and third gaps are situated so that the diameters of the first and second apertures change as the widths of the first, second, and third gaps change.

18. The track chain assembly of claim 15, wherein the width of the third gap is smaller than the first and second gaps.

19. The track chain assembly of claim 15, wherein the third gap is sized and located so that changes in the widths of the first and second gaps are limited by the change in the width of the third gap.

20. The track chain assembly of claim 15, wherein the third gap is sized and located so that changes in the diameters of the first and second apertures are limited by the change in the width of the third gap.

* * * * *